United States Patent
Yamada

(10) Patent No.: US 9,285,008 B2
(45) Date of Patent: Mar. 15, 2016

(54) DAMPING VALVE FOR SHOCK ABSORBER

(71) Applicant: KAYABA INDUSTRY CO., LTD., Tokyo (JP)

(72) Inventor: Hideki Yamada, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/373,378

(22) PCT Filed: Feb. 18, 2013

(86) PCT No.: PCT/JP2013/053799
§ 371 (c)(1),
(2) Date: Jul. 21, 2014

(87) PCT Pub. No.: WO2013/136910
PCT Pub. Date: Sep. 19, 2013

(65) Prior Publication Data
US 2015/0008083 A1    Jan. 8, 2015

(30) Foreign Application Priority Data
Mar. 14, 2012    (JP) .................................. 2012-056845

(51) Int. Cl.
*F16F 9/32*      (2006.01)
*F16F 9/348*    (2006.01)

(52) U.S. Cl.
CPC .............. *F16F 9/348* (2013.01); *F16F 9/3214* (2013.01); *F16F 2226/04* (2013.01)

(58) Field of Classification Search
CPC ............... F16F 9/18; F16F 9/185; F16F 9/19; F16F 9/3214; F16F 9/348; F16F 9/3481; F16F 9/3484; F16F 9/3487
See application file for complete search history.

(56) References Cited

U.S. PATENT DOCUMENTS

| 6,199,671 B1 | 3/2001 | Thyssen | |
|---|---|---|---|
| 2009/0242341 A1* | 10/2009 | Ashiba et al. | 188/283 |
| 2011/0209957 A1 | 9/2011 | Ashiba | |

(Continued)

FOREIGN PATENT DOCUMENTS

| CN | 1721729 A | 1/2006 |
|---|---|---|
| DE | 4315457 A1 | 11/1994 |
| DE | 102010050868 A1 * | 5/2012 |

(Continued)

OTHER PUBLICATIONS

Chinese Office Action dated Apr. 9, 2015.

(Continued)

*Primary Examiner* — Anna Momper
(74) *Attorney, Agent, or Firm* — Rabin & Berdo, P.C.

(57) ABSTRACT

A damping valve includes a piston with a one-side disk and an other-side disk, a port configured to include through holes, a piston rod, and a nut. A plurality of the through holes of the other-side disk are formed along between the inner peripheral seat surface and the outer peripheral seat surface. Elastic deforming portions are formed between the through holes of the other-side disk. A clearance is formed between the inner peripheral seat surface of the one-side disk and that of the other-side disk in a state where the nut is not tightened and the outer peripheral seat surface of the one-side disk and that of the other-side disk are in contact. The elastic deforming portions of the other-side disk are strained and the respective inner peripheral seat surfaces come into contact in a state where the nut is tightened.

11 Claims, 7 Drawing Sheets

(56) References Cited

U.S. PATENT DOCUMENTS

2012/0048666 A1 3/2012 Murakami
2013/0305919 A1* 11/2013 Frey et al. .................... 92/181 P

FOREIGN PATENT DOCUMENTS

| | | |
|---|---|---|
| FR | 1336186 A | 8/1963 |
| JP | 08-261268 A | 10/1996 |
| JP | 10-103512 A | 4/1998 |
| JP | 2006-275216 A | 10/2006 |
| JP | 2008-138696 A | 6/2008 |
| JP | 2008-303927 A | 12/2008 |
| JP | 2011-080573 A | 4/2011 |
| JP | 2011-179550 A | 9/2011 |
| KR | 10-2012-0021258 A | 3/2012 |

OTHER PUBLICATIONS

Extended European Search Report dated Oct. 8, 2015.

* cited by examiner

DAMPING VALVE FOR SHOCK ABSORBER

TECHNICAL FIELD

The present invention relates to a damping valve for shock absorber.

BACKGROUND ART

A known damping valve for shock absorber is applied, for example, to a piston unit or the like of a shock absorber for vehicle, is provided with a piston which partitions one chamber and another chamber in the shock absorber, a port which is formed in this piston to allow communication between the one and the other chambers and a leaf valve which is seated on a valve seat surrounding the outer periphery of a window communicating with an output end of this port, and opens the port by deflecting an outer peripheral side of this leaf valve.

In a shock absorber for vehicle, in order to improve the ride quality of a vehicle, it is preferable to firmly damp the vibration of the vehicle by increasing a damping force in a region where a piston speed is low and prevent an excessive damping force by decreasing a damping coefficient when the piston speed reaches a certain high speed. To realize such a damping characteristic (change in damping force in relation to piston speed), various proposals have been made.

For example, in a damping valve for shock absorber disclosed in JP2008-138696A, a piston is divided into a one-side disk and an other-side disk provided to be placed on the one-side disk and formed with a one-side port for permitting the passage of working fluid when a shock absorber extends and an other-side port for permitting the passage of the working fluid when the shock absorber contracts.

Each of the one-side and other-side disks includes an annular inner peripheral seat surface at a corresponding position of each mating surface and an annular outer peripheral seat surface formed at an outer side of the inner peripheral seat surface, and an annular projection is formed on the outer peripheral seat surface of the other-side disk. By squeezing the projection with a nut tightening force, the outer peripheral seat surface of the one-side disk and that of the other-side disk are brought into close contact, thereby preventing the leakage of the working fluid in the middle of the one-side port.

Further, a structure is disclosed in JP1996-261268A which prevents the leakage of working fluid in the middle of a port formed in a divided piston by bringing outer peripheral seat surfaces into close contact via a seal.

SUMMARY OF INVENTION

In the case of applying the above damping valves to a shock absorber for vehicle, it is possible to improve the ride quality of a vehicle by realizing a preferable damping characteristic, but there are the following problems.

Since the projection is squeezed by the nut tightening force in the damping valve disclosed in JP2008-138696A, a large tightening force is necessary.

Further, since an outer peripheral side of the other-side disk is deflected toward the leaf valve with an inner peripheral side, which serves as a fixed end, as a support point, a diameter of the valve seat changes and the damping force largely varies.

Since the seal is interposed between the outer peripheral seat surface of the one-side disk and that of the other-side disk in the damping valve disclosed in JP1996-261268A, the configuration becomes complicated.

The present invention was developed in view of the above problems and aims to provide a damping valve for shock absorber which can reduce a nut tightening force and a damping force variation and does not complicate a structure.

According to one aspect of the present invention, a damping valve for shock absorber includes a valve disk with a one-side disk and an other-side disk provided to be placed on the one-side disk and partitioning one chamber and another chamber, a port configured to include through holes formed in the one-side and other-side disks and allowing communication between the one and the other chambers, a shaft member penetrating through the valve disk, and a nut for fixing the valve disk to the shaft member by being threadably mounted on the tip of the shaft member, wherein an annular inner peripheral seat surface and an annular outer peripheral seat surface formed at an outer side of the inner peripheral seat surface are respectively formed at corresponding positions of each mating surface of the one-side and other-side disks, each through hole is open between each inner peripheral seat surface and each outer peripheral seat surface, a plurality of the through holes of the other-side disk are formed along between the inner peripheral seat surface of the other-side disk and the outer peripheral seat surface of the other-side disk, elastic deforming portions are formed between the through holes of the other-side disk, a clearance is formed between the inner peripheral seat surface of the one-side disk and that of the other-side disk in a state where the nut is not tightened and the outer peripheral seat surface of the one-side disk and that of the other-side disk are in contact, and the elastic deforming portions of the other-side disk are strained and the inner peripheral seat surface of the one-side disk and that of the other-side disk come into contact in a state where the nut is tightened.

Embodiments and advantages of the present invention are described in detail below with reference to the accompanying drawings.

DESCRIPTION OF EMBODIMENTS

First Embodiment

Hereinafter, a first embodiment of the present invention is described with reference to the drawings. It should be noted that the same reference signs given through several drawings denote the same or corresponding components.

Figure 1:
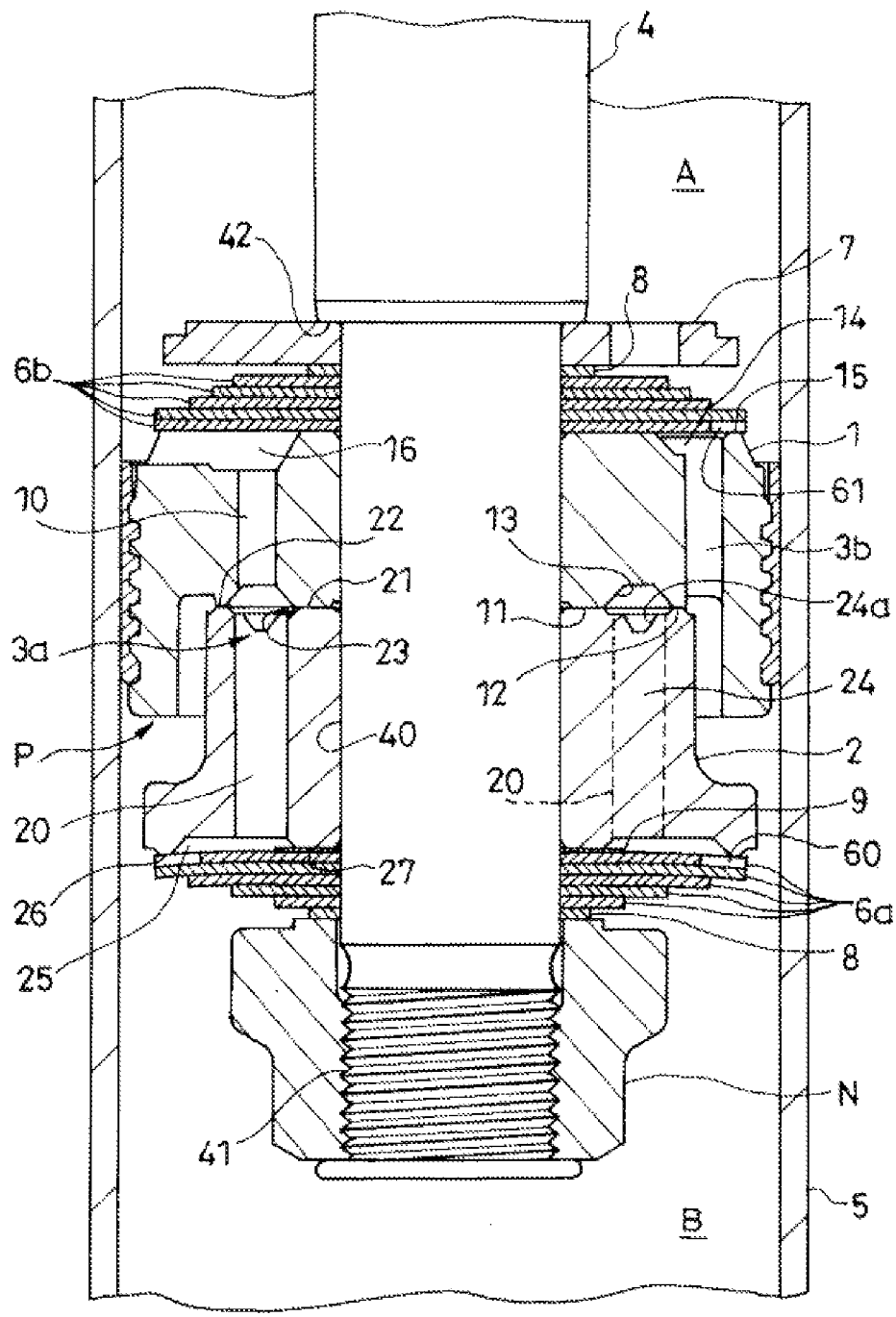
FIG. 1 is a sectional view showing a piston unit of a shock absorber to which a damping valve according to a first embodiment is applied.

As shown in FIG. 1, a damping valve according to the present embodiment is applied to a piston unit of a shock absorber and is provided with a piston P which is a valve disk composed of a one-side disk 1 and an other-side disk 2 provided to be placed on the one-side disk 1 and partitioning one chamber A and another chamber B, a one-side port 3a which is a port configured to include through holes 10, 20 respectively formed in the disks 1, 2 and allowing communication between the one chamber A and the other chamber B, a piston rod 4 which is a shaft member penetrating through the piston P, and a nut N which fixes the piston P to the piston rod 4 by being threadably mounted on a tip 41 of the piston rod 4.

Each of the one-side and other-side disks 1, 2 includes an annular inner peripheral seat surface 11, 21 at a corresponding position of each mating surface and an annular outer peripheral seat surface 12, 22 formed at an outer side of the inner peripheral seat surface 11, 21 and each through hole 10, 20 is open between each inner peripheral seat surface 11, 21 and each outer peripheral seat surface 12, 22.

When the outer peripheral seat surface 12 of the one-side disk 1 and the outer peripheral seat surface 22 of the other-side disk 2 are brought into contact, a clearance S (FIG. 3A) is formed between the inner peripheral seat surface 11 of the one-side disk 1 and the inner peripheral seat surface 21 of the other-side disk 2.

Further, the other-side disk 2 is formed with a plurality of through holes 20 along between the inner peripheral seat surface 21 of the other-side disk 2 and the outer peripheral seat surface 22 thereof (FIG. 2), and elastic deforming portions 24 are formed between the through holes 20 of the other-side disk 2.

The shock absorber to which the damping valve according to the present embodiment is applied is configured to be provided with a cylinder 5 for storing working fluid, a head member (not shown) for sealing the upper end of the cylinder 5, the piston rod 4 slidably penetrating through the head member, the piston P fixed to a mounting portion of the piston rod 4, the one and the other chambers A, B partitioned by the piston P, a sealing member (not shown) for sealing a lower end side of the cylinder 5, and a reservoir (not shown) or an air chamber (not shown) for compensating for a volumetric change in the cylinder caused by the volume of the piston rod 4 entering the cylinder 5.

When the piston P vertically moves together with the piston rod 4 relative to the cylinder 5, the working fluid flows between the one and the other chambers A, B via the ports 3a, 3b. Resistance is applied to those flows of the working fluid respectively by corresponding leaf valves 6a, 6b to generate a predetermined pressure loss, whereby a predetermined damping force is generated in the shock absorber.

The damping valve is described in detail below.

The piston P is vertically divided into upper and lower sides, wherein the one-side disk 1 is arranged on the side of the one chamber A and the other-side disk 2 is arranged on the side of the other chamber B.

Further, the piston P is formed with the one-side port 3a for permitting the passage of the working fluid from the one chamber A to the other chamber B and the other-side port 3b for permitting the passage of the working fluid from the other chamber B to the one chamber A.

The one-side port 3a is configured to include the through hole 10 formed in an inner peripheral side of the one-side disk 1 and located on an entrance side of the one-side port 3a and the through holes 20 communicating with the through hole 10, formed in the other-side disk 2 and located on an exit side of the one-side port 3a. The other-side port 3b is formed in an outer peripheral side of the one-side disk 1 so that the entrance thereof is not closed by the other-side disk 2.

Further, the one-side disk 1 is formed with a window 14 continuous with an exit end of the other-side port 3b and a petal-shaped valve seat 15 surrounding the window 14. An opening window 16 is formed on an outer side of the valve seat 15, so that the leaf valves 6b, which are seated on and separated from the valve seat 15, do not close the entrance of the one-side port 3a.

The other-side disk 2 is formed with an annular window 25 continuous with an exit end of the one-side port 3a and an annular valve seat 26 formed on an outer peripheral side of the window 25.

Further, each of the disks 1, 2 includes the annular inner peripheral seat surface 11, 21 at the corresponding position of each mating surface and the annular outer peripheral seat surface 12, 22 formed at the outer side of the inner peripheral seat surface 11, 21, and each of annular grooves 13, 23 is formed between each inner peripheral seat surface 11, 21 and each outer peripheral seat surface 12, 22.

It should be noted that the corresponding positions only have to be positions where the inner peripheral seat surfaces 11, 21 and the outer peripheral seat surfaces 12, 22 of the disks 1, 2 respectively meet when the disks 1, 2 are placed one over the other, and the inner peripheral seat surfaces 11, 21, the outer peripheral seat surfaces 12, 22 and the annular grooves 13, 23 need not be set at exactly the same positions and in exactly the same shapes.

The through hole 10 of the one-side disk 1 is formed to be continuous with the annular groove 13 of the one-side disk 1 and the through holes 20 of the other-side disk 2 are formed to be continuous with the annular groove 23 of the other-side disk 2. The through holes 10, 20 communicate via the annular grooves 13, 23 and constitute the one-side port 3a.

A mounting portion 40 of the piston rod 4 penetrates through axial center portions of the disks 1, 2 and projects out from the piston P.

An outer diameter of the mounting portion 40 of the piston rod 4 is smaller than that of the piston rod 4 and a step portion 42 is formed between parts having different outer diameters.

A screw groove (not denoted by a reference sign) is formed on the tip 41 of the mounting portion 40 and the nut N is threadably mounted. A valve stopper 7, a spacer 8, the leaf valves 6b, the one-side disk 1, the other-side disk 2, a shim 9, the leaf valves 6a and a spacer 8 are sandwiched in this order from the step portion 42 side between the nut N and the step portion 42.

Inner peripheral sides of a plurality of leaf valves 6a are fixed to the mounting portion 40 of the piston rod 4 by being sandwiched between the nut N and the step portion 42 and outer peripheral sides thereof are held in contact with the valve seat 26 of the other-side disk 2 to close the exit end of the one-side port 3a.

Inner peripheral sides of a plurality of leaf valves 6b are fixed to the mounting portion 40 of the piston rod 4 by being sandwiched between the nut N and the step portion 42 and outer peripheral sides thereof are held in contact with the valve seat 15 of the one-side disk 1 to close the exit end of the other-side port 3b.

Accordingly, the leaf valves 6a, 6b can open the ports 3a, 3b by the deflection of the outer peripheral sides with the inner peripherals sides as fixed ends.

In the present embodiment, the height of the valve seat 26 of the other-side disk 2 is set to be larger than that of a seat portion 27 of the other-side disk 2 when the piston P and the leaf valves 6a, 6b are fixed to the mounting portion 40 of the piston rod 4 by tightening the nut N.

Accordingly, when the leaf valves 6a for opening and closing the one-side port 3a are fixed to the mounting portion

40 of the piston rod 4, the outer peripheral sides of the leaf valves 6a can be initially deflected.

Further, the shim 9 in the form of an annular plate formed in such a size as not to close the exit end of the one-side port 3a is fixed to the mounting portion 40 of the piston rod 4 between the leaf valves 6a and the other-side disk 2 with an inner peripheral side as a fixed end similarly to the leaf valves 6a, 6b.

Accordingly, the amount of initial deflection of the leaf valves 6a can be adjusted by the thickness of the shim 9 and the leaf valves 6a can adjust a valve opening pressure in opening the one-side port 3a at a distance from the valve seat 26 of the other-side disk 2 by setting this deflection amount.

Further, cuts 60, 61 are respectively provided on the outer peripheral sides of the leaf valves 6a, 6b seated on the valve seats 26, 15, thereby forming orifices.

Figure 2:
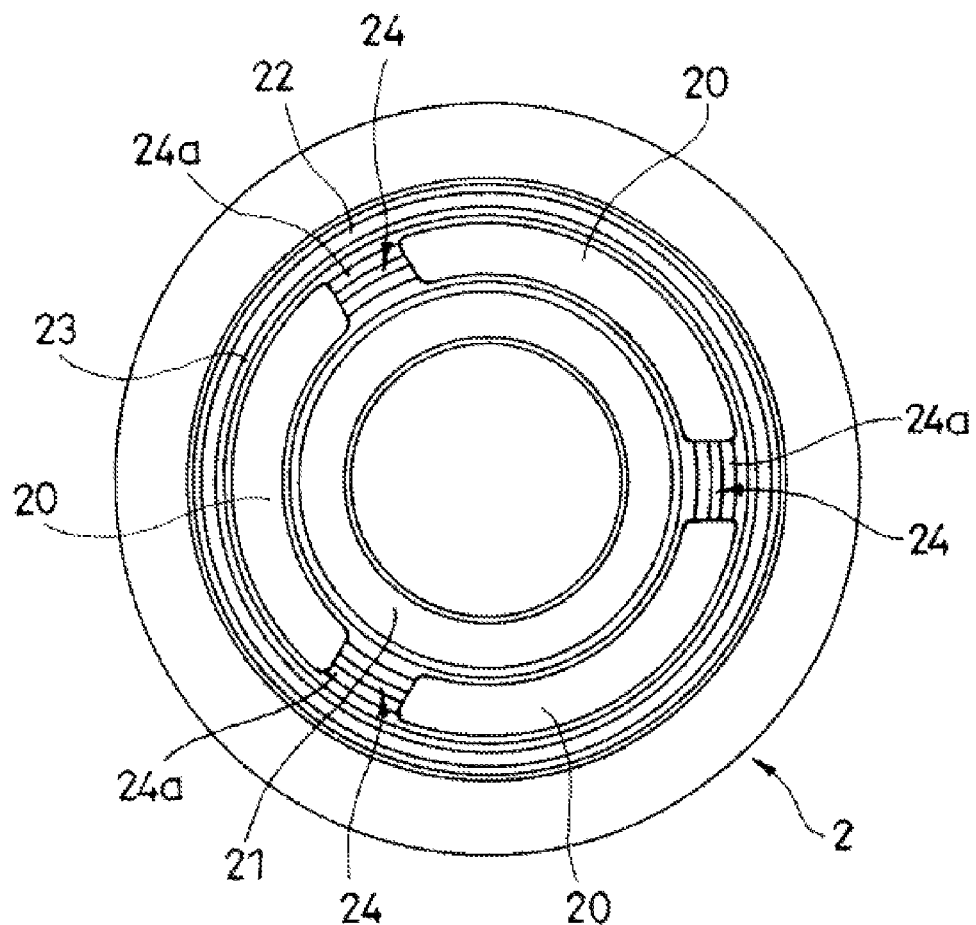
FIG. 2 is a plan view showing an other-side disk.

In the present embodiment, the through holes 20 formed in the other-side disk 2 are formed into arcuate shapes along the annular groove 23 of the other-side disk 2 and identically shaped through holes 20 are arranged at three positions at equal intervals as shown in FIG. 2. The easily deformable elastic deforming portions 24 are respectively formed between these through holes 20. Further, the sum (total opening area) of respective opening areas (port diameter) of these through holes 20 is set to be larger than that (total opening area) of an opening area (port diameter) of the through hole 10 of the one-side disk 1 so as not to throttle the one-side port 3a by the through holes 20 of the other-side disk 2.

It should be noted that since a cross-sectional area of each of the through holes 10, 20 cut along a plane perpendicular to a central axis of the piston rod 4 is set to be equal from the entrance to the exit in the present embodiment, the sums of the respective cross-sectional areas of the through holes 10, 20 are equivalent to the respective total opening areas of the through holes 10, 20. However, if the through holes 10, 20 are partly reduced in diameter, the sums of the respective cross-sectional areas of narrowest parts of the through holes 10, 20 are equivalent to the respective total opening areas of the through holes 10, 20.

Figure 3A:
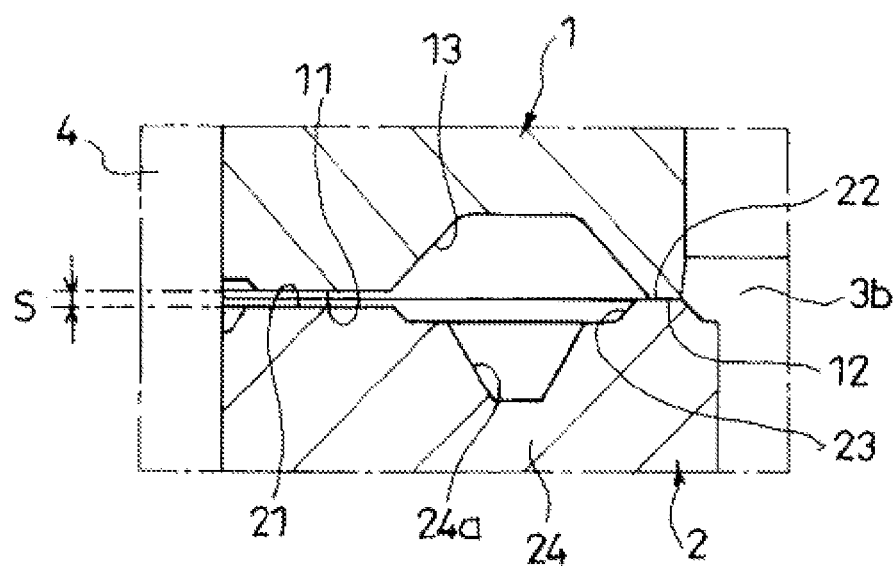
FIG. 3A is a sectional view showing contact portions of a one-side disk and the other-side disk before a nut is tightened.
Figure 3B:
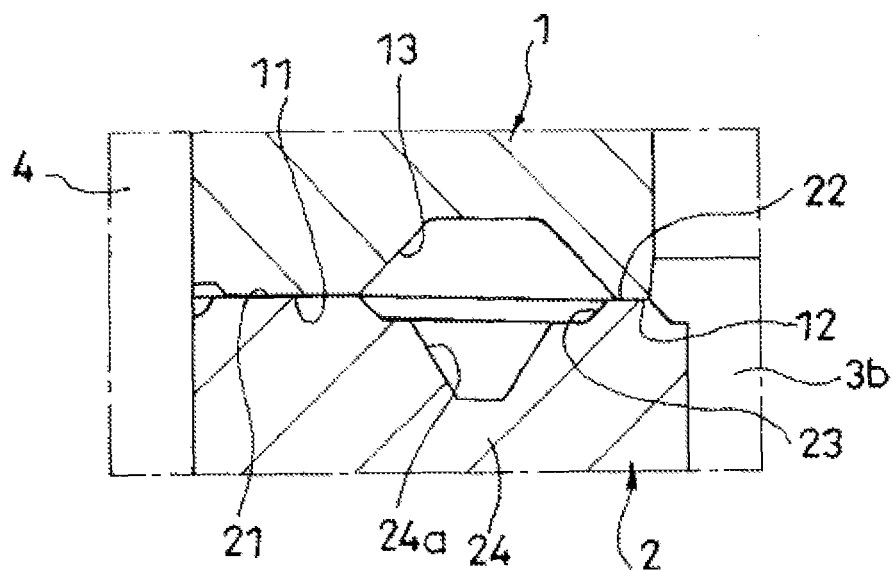
FIG. 3B is a sectional view showing the contact portions of the one-side and other-side disks after the nut is tightened.

As shown in FIGS. 1, 3A and 3B, the elastic deforming portion 24 is formed with an arcuate groove 24a which extends along the annular groove 23 and has an inverted trapezoidal cross-section, thereby being thinned to be easily deformable.

The heights of the outer peripheral seat surfaces 12, 22 and the inner peripheral seat surfaces 11, 21 of the disks 1, 2 are set to form the clearance S between the inner peripheral seat surface 11 of the one-side disk 1 and the inner peripheral seat surface 21 of the other-side disk 2 when the outer peripheral seat surface 12 of the one-side disk 1 and the outer peripheral seat surface 22 of the other-side disk 2 are brought into contact as shown in FIG. 3A.

When the nut N is tightened, the elastic deforming portions 24 of the other-side disk 2 are strained by that tightening force and a side of the other-side disk 2 radially inwardly of the annular groove 23 parallelly moves in a direction toward the one-side disk 1 as shown in FIG. 3B.

Accordingly, the clearance S between the inner peripheral seat surfaces 11, 21 is eliminated and the outer peripheral seat surface 22 of the other-side disk 2 is pressed into close contact with the outer peripheral seat surface 12 of the one-side disk 1, wherefore the working fluid does not leak out in the middle of the one-side port 3a.

Next, functions and effects of the damping valve according to the present embodiment are described with reference to a comparative example of the present invention.

First, when the shock absorber extends to move the piston P in a direction toward the one chamber A, an inner pressure in the one chamber A increases and the working fluid in the one chamber A tries to move into the other chamber B through the opening window 16 and the one-side port 3a.

When a piston speed, which is an extending/contracting speed of the shock absorber, is in a low speed region, the working fluid passes through the orifice formed by the cut 60 provided on the outer peripheral sides of the leaf valves 6a.

When the piston speed increases beyond the low speed region and reaches a middle/high speed region, the working fluid deflects the outer peripheral sides of the leaf valves 6a and passes through a clearance between the leaf valves 6a and the valve seat 26.

On the other hand, when the shock absorber contracts to move the piston P in a direction toward the other chamber B, an inner pressure in the other chamber B increases and the working fluid in the other chamber B tries to move into the one chamber A through the other-side port 3b.

When the piston speed is in the low speed region, the working fluid passes through the orifice formed by the cut 61 provided on the outer peripheral sides of the leaf valves 6b.

When the piston speed increases beyond the low speed region and reaches the middle/high speed region, the working fluid deflects the outer peripheral sides of the leaf valves 6b and passes through a clearance between the leaf valves 6b and the valve seat 15.

That is, the shock absorber generates a damping force by a damping characteristic (change in damping force in relation to piston speed), which is a square-law characteristic unique to the orifice formed by the cut 60, in a region where the piston speed is low during extension.

Since the leaf valves 6a for closing the one-side port 3a are initially deflected in the present embodiment, the vibration of a vehicle can be firmly damped by increasing the damping force.

Likewise during extension, the shock absorber generates a damping force by such a damping characteristic that a damping coefficient becomes smaller than that of the orifice by separating the leaf valves 6a from the valve seat 15 and opening the one-side port 3a when the piston speed increases.

Since the piston P is divided into the one-side disk 1 and the other-side disk 2 in the present embodiment, the valve seat 26 surrounding the window 25 continuous with the exit end of the one-side port 3a can be annularly formed and the valve seat 26 can be formed to have a large diameter. Thus, the diameters of the leaf valves 6a can be increased.

In this way, the leaf valves 6a for generating a damping force when the shock absorber extends can be made easily deflectable and an excessive damping force can be prevented by decreasing the damping coefficient when the piston speed is in the middle/high speed region. Thus, the shock absorber provided with the damping valve according to the present embodiment can realize a desired damping characteristic and improve the ride comfort of the vehicle.

Figure 5:
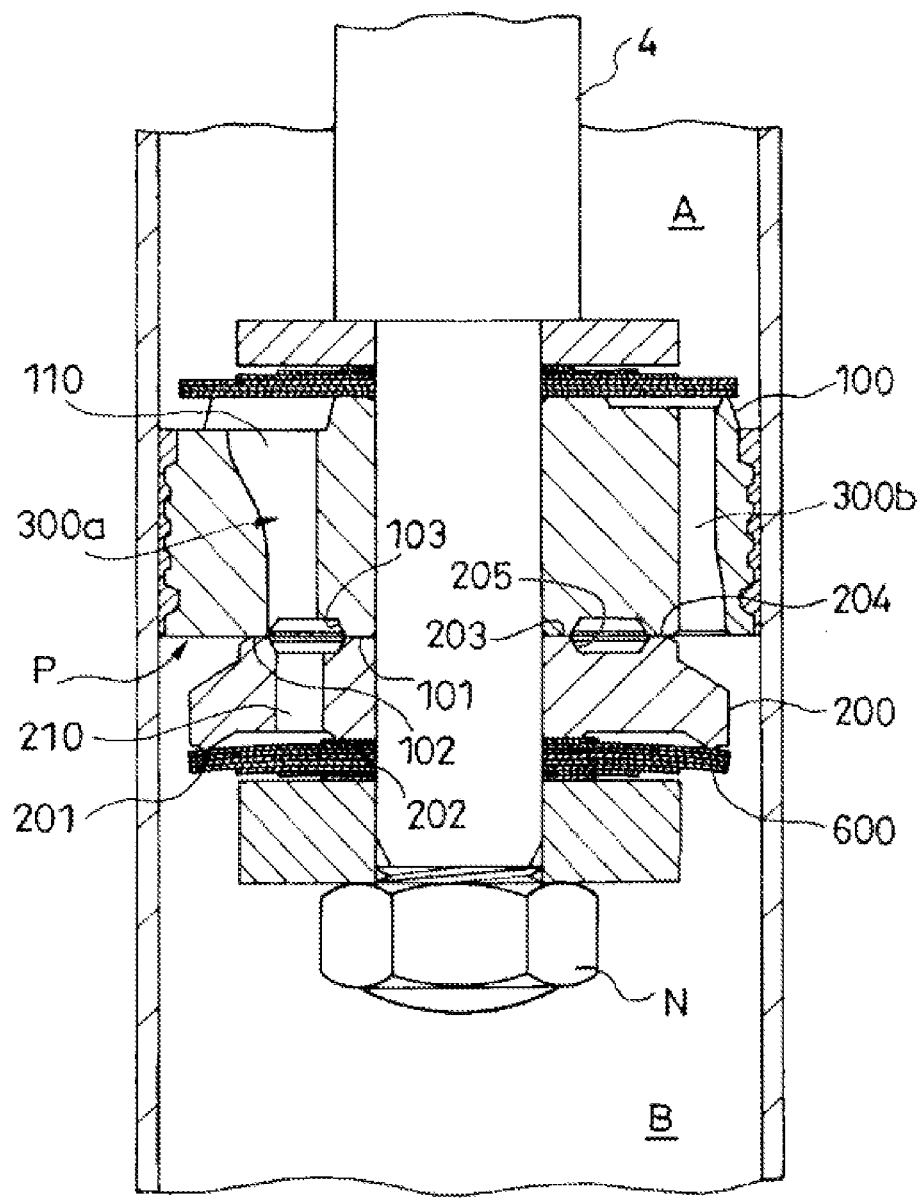
FIG. 5 is a sectional view showing a piston unit of a shock absorber to which a damping valve of a comparative example is applied.
Figure 6:
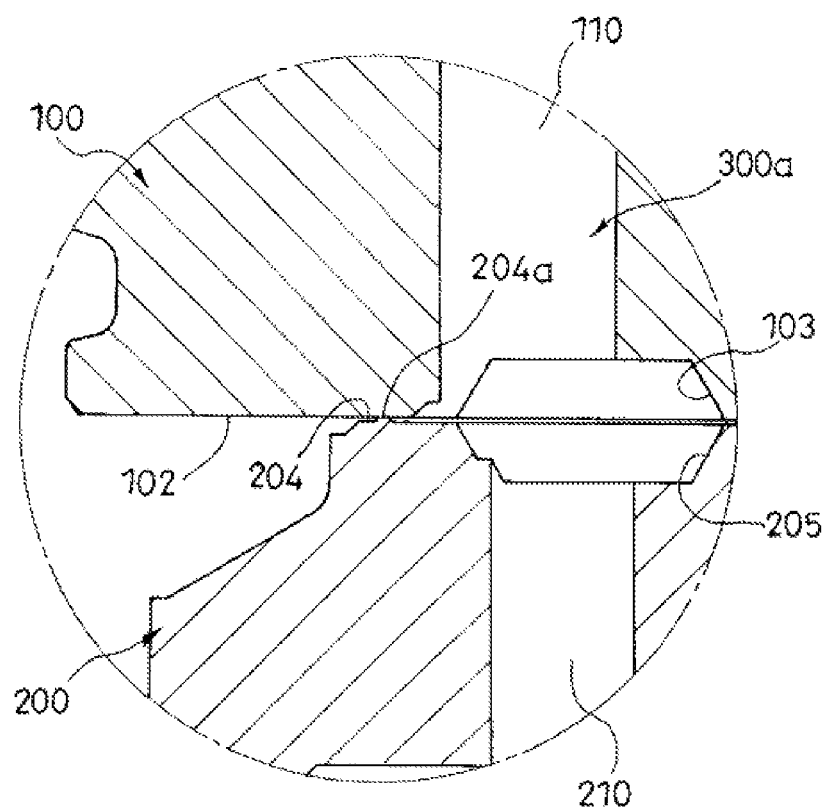
FIG. 6 is a sectional view showing contact portions of a one-side disk and an other-side disk of the damping valve of the comparative example.

FIG. 5 is a sectional view showing a piston unit of a shock absorber to which a damping valve of a comparative example is applied. FIG. 6 is a sectional view showing contact portions of a one-side disk and an other-side disk of the damping valve of the comparative example.

As shown in FIG. 5, a piston P is divided into a one-side disk 100 and an other-side disk 200 provided to be placed on the one-side disk 100 in the damping valve of the comparative example. The piston P is formed with a one-side port 300a for permitting the passage of working fluid when the shock absorber extends and an other-side port 300*b* for permitting the passage of the working fluid when the shock absorber contracts.

The one-side port 300*a* is composed of a through hole 110 formed in an inner peripheral side of the one-side disk 100 and a through hole 210 communicating with the through hole 110 and formed in the other-side disk 200, and the other-side port 300*b* is formed in an outer peripheral side of the one-side disk 100 so that the entrance is not closed by the other-side disk 200.

That is, a valve seat 201 on which leaf valves 600 for opening and closing the one-side port 300*a* are seated and from which the leaf valves 600 are separated is formed to be annular and have a large diameter by forming the exit of the one-side port 300*a* on the other-side disk 200.

Further, an annular seat portion 202 on which inner peripheral sides of the leaf valves 600, which are fixed ends, are placed is formed on a side of the other-side disk 200 near the leaf valves 600. The seat portion 202 is arranged at a position lower than the valve seat 201, whereby the leaf valves 600 are initially deflected.

Accordingly, it becomes difficult to separate the leaf valves 600 from the valve seat 201 in a region where a piston speed is low when the shock absorber extends, wherefore a damping force can be easily increased.

Further, the diameters of the leaf valves 600 can be increased by forming the valve seat 201 into an annular shape having a large diameter. Thus, it is possible to make the leaf valves 600 easily deflectable, suppress an excessive damping force when the piston speed is high and improve the ride quality of a vehicle by realizing a preferable damping characteristic.

Further, each of the one-side and other-side disks 100, 200 includes an annular inner peripheral seat surface 101, 203 at a corresponding position of each mating surface, an annular outer peripheral seat surface 102, 204 formed at an outer side of this inner peripheral seat surface 101, 203, and an annular groove 103, 205 formed between the inner peripheral seat surface 101, 203 and the outer peripheral seat surface 102, 204 and communicating with each through hole 110, 210.

As shown in FIG. 6, the outer peripheral seat surface 204 of the other-side disk 200 is formed with an annular projection 204*a*. By squeezing the projection 204*a* by a tightening force of the nut N, the outer peripheral seat surface 102 of the one-side disk 100 and the outer peripheral seat surface 204 of the other-side disk 200 are brought into close contact, thereby preventing the leakage of working fluid in the middle of the one-side port 300*a*.

As described above, in the case of applying the damping valve of the comparative example to the shock absorber for vehicle, the ride quality of the vehicle can be improved by realizing a preferable damping characteristic.

However, since the projection 204*a* is squeezed by the tightening force of the nut N in the damping valve of the comparative example, there is a problem of requiring a large tightening force. Further, since the outer peripheral side of the other-side disk 200 is deflected toward the leaf valves 600 with the inner peripheral side serving as a fixed end as a support point, there is a problem that the diameter of the valve seat 201 changes and the damping force largely varies.

Contrary to this, in the present embodiment, the other-side disk 2 is provided with the easily deformable elastic deforming portions 24 between the through holes 20, whereby the tightening force of the nut N necessary to bring the outer peripheral seat surface 12 of the one-side disk 1 and the outer peripheral seat surface 22 of the other-side disk 2 into close contact can be reduced.

Further, since the inner peripheral seat surface 21 of the other-side disk 2 parallelly moves in the direction toward the one-side disk by the deformation of the elastic deforming portions 24, the deformation of the other-side disk 2 around the valve seat 26 can be suppressed. Thus, a change in the diameter of the valve seat 26 can be suppressed and the variation of the damping force can be reduced.

Further, since it is sufficient, as a structure for bringing the outer peripheral seat surfaces 12, 22 into close contact, only to set the intervals between the through holes 20 formed in the other-side disk 2 such that the elastic deforming portions 24 are deformable, the damping valve is not complicated.

Further, the shock absorber according to the present embodiment generates a damping force with a port characteristic due to resistance produced during the passage of the working fluid through the one-side port 3*a* when the piston speed reaches a high speed region and the leaf valves 6*a* are opened to a certain extent during extension.

In the present embodiment, the total opening area of the through holes 20 in the other-side disk 2 is set to be larger than that of the through hole 10 in the one-side disk 1. That is, since the through holes 20 of the other-side disk 2 is set not to throttle the one-side port 3*a*, a damping force with a port characteristic can be set by the total opening area of the through hole 10 in the one-side disk 1.

Accordingly, it is possible not only to change a damping force when the piston speed is in the high speed region by a replacement with a one-side disk having a different total opening area (port diameter) of the through hole 10, but also to use only the one-side disk 1 when it is desired to increase a damping force in the middle/high speed region. Thus, various damping force characteristics can be realized.

Further, by increasing the total opening area of the through holes 20 of the other-side disk 2, the intervals between the through holes 20 naturally become narrower and parts between the through holes 20 can be formed into the elastic deforming portions 24.

Further, since the annular groove 13 is formed between the inner peripheral seat surface 11 and the outer peripheral seat surface 12 of the one-side disk 1 and the annular groove 23 is formed between the inner peripheral seat surface 21 and the outer peripheral seat surface 22 of the other-side disk 2, the through holes 10, 20 can be constantly allowed to communicate even if the positions of the through hole 10 of the one-side disk 1 and the through holes 20 of the other-side disk 2 are displaced from each other, and positioning is not necessary.

Further, if the through hole 20 of the other-side disk 2 is formed into a true circular or elliptical shape and a plurality of the through holes 20 are provided along the annular groove 23, the damping force is thought to change depending on the positions (phases) of the through holes 20 of the other-side disk 2 relative to the through hole 10 of the one-side disk 1 and largely vary. However, since the through holes 20 of the other-side disk 2 are formed into arcuate shapes in the present embodiment, the through holes 20 can be formed to be long in a circumferential direction of the annular groove 23. Thus, a change in the damping force caused by the positions (phases) of the through holes 20 of the other-side disk 2 relative to the through hole 10 of the one-side disk 1 can be suppressed.

Further, since the identically shaped through holes 20 are formed at equal intervals in the other-side disk 2, the elastic deforming portions 24 are strained and the side of the other-side disk 2 radially inwardly and outwardly of the annular groove 23 can be parallelly displaced when being displaced in the axial direction.

Second Embodiment

Next, a second embodiment of the present invention is described with reference to the drawings. The second embodiment differs from the first embodiment only in the configuration for initially deflecting the leaf valves 6a for opening and closing the one-side port 3a. Since the other configuration is the same as in the first embodiment, the same components are denoted by the same reference signs and not described.

Figure 4:
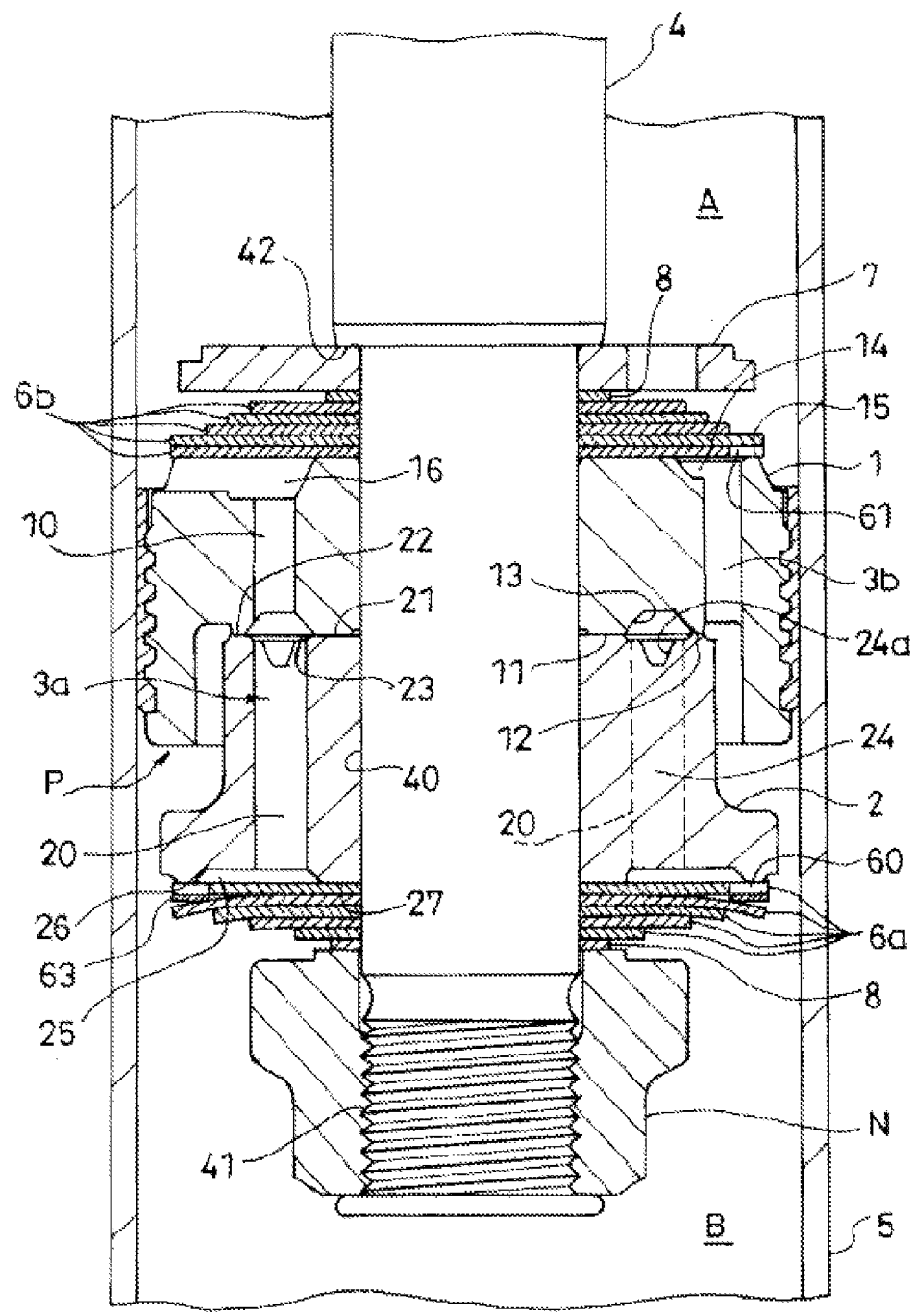
FIG. 4 is a sectional view showing a piston unit of a shock absorber to which a damping valve according to a second embodiment is applied.

In the present embodiment, a ring 63 is mounted on any one of a plurality of leaf valves 6a and the leaf valves 6a laminated closer to a nut N than the ring 63 are initially deflected as shown in FIG. 4.

Accordingly, as compared with the first embodiment in which the outer peripheral sides of all the leaf valves 6a laminated on the other-side disk 2 are deflected by changing the heights of the seat portion 27 and the valve seat 26 of the other-side disk 2, the leaf valves 6a of the present embodiment can be more easily seated on a valve seat 26 and a one-side port 3a can be quickly closed after the one-side port 3a is opened.

It should be noted that an initial deflection amount of the leaf valves 6a can be adjusted by the thickness of the ring 63 and the leaf valves 6a can adjust a valve opening pressure in opening the one-side port 3a at a distance from the valve seat 26 of an other-side disk 2 by setting this deflection amount.

Further, a shock absorber provided with a damping valve according to the present embodiment can improve the ride quality of a vehicle by increasing a damping force in a region where a piston speed is low to firmly damp the vibration of the vehicle and decreasing a damping coefficient when the piston speed increases so that the damping force does not become excessive as in the first embodiment.

Further, since elastic deforming portions 24 are provided also in the damping valve according to the present embodiment, an outer peripheral seat surface 12 of a one-side disk 1 and an outer peripheral seat surface 22 of the other-side disk 2 can be brought into close contact by a small tightening force to reduce a damping force variation without complicating a structure as in the first embodiment.

Embodiments of this invention were described above, but the above embodiments are merely examples of applications of this invention, and the technical scope of this invention is not limited to the specific constitutions of the above embodiments.

For example, although the damping valves in the above embodiments are applied to the piston units of the shock absorbers, they may be applied to base valve units of shock absorbers.

Further, although the other-side disk 2 is arranged on the tip side of the piston rod 4 in the above embodiments, the one-side disk 1 may be arranged on the tip side of the piston rod 4.

Further, although the total opening area of the through holes 20 in the other-side disk 2 is set to be larger than that of the through hole 10 in the one-side disk 1 in the above embodiments, there is no limitation to this and the size of each through hole 10, 20 can be set as appropriate.

Further, although the annular grooves 13, 23 are respectively formed in the one-side disk 1 and the other-side disk 2 in the above embodiments, an annular groove communicating with the through holes 10, 20 may be formed in either one of the disks. Also in this case, positioning is not necessary. Further, the annular grooves 13, 23 may not be formed if the through holes 10, 20 can be positioned.

Further, although the arcuate through holes 20 are formed at three positions along the annular groove 23 of the other-side disk 2 in the above embodiments, the shape and number of the through holes 20 can be changed as appropriate if the easily deformable elastic deforming portions 24 can be formed between the through holes 20.

It should be noted that if there is one through hole 20 in the other-side disk 2, the through hole 20 is formed into an arcuate shape along (annular groove 23) between the inner peripheral seat surface 21 and the outer peripheral seat surface 22 and an elastic deforming portion 24 is formed between opposite end parts of the through hole 20.

Further, although the arcuate grooves 24a are formed on the sides of the elastic deforming portions 24 near the one-side disk 1 in the above embodiments, the elastic deforming portions 24 may be made easily deformable by forming arcuate grooves on sides of the elastic deforming portions 24 near the leaf valves 6a or on both sides. Further, if the elastic deforming portions 24 are deformable, the grooves may not be provided.

With respect to the above description, the contents of application No. 2012-056845, with a filing date of Mar. 14, 2012 in Japan, are incorporated herein by reference.

The invention claimed is:

1. A damping valve for a shock absorber, comprising:
   a valve disk including a one-side disk and an other-side disk provided to be placed on the one-side disk and partitioning one chamber and another chamber;
   a port configured to include through holes formed in the one-side and other-side disks and allowing communication between the one and the other chambers;
   a shaft member penetrating through the valve disk; and
   a nut for fixing the valve disk to the shaft member by being threadably mounted on the tip of the shaft member;
   wherein:
   an annular inner peripheral seat surface and an annular outer peripheral seat surface formed at an outer side of the inner peripheral seat surface are respectively formed at corresponding positions of each mating surface of the one-side and other-side disks;
   the through holes are each open between each inner peripheral seat surface and each outer peripheral seat surface;
   a plurality of the through holes, which are in the other-side disk, extending from the inner peripheral seat surface of the other-side disk to the outer peripheral seat surface of the other-side disk;
   elastic deforming portions are formed between the plurality of through holes of the other-side disk; and
   the elastic deforming portions of the other-side disk are strained and the inner peripheral seat surface of the one-side disk and that of the other-side disk come into contact in a state where the nut is tightened.

2. The damping valve for the shock absorber according to claim 1, wherein:
   the plurality of through holes in the other-side disk each have an identical arcuate shape, and are arranged at equal intervals.

3. The damping valve for the shock absorber according to claim 1, wherein:
   an annular groove communicating with each through hole is formed at least either between the outer peripheral seat surface and the inner peripheral seat surface of the one-side disk or between the outer peripheral seat surface and the inner peripheral seat surface of the other-side disk.

4. The damping valve for the shock absorber according to claim 1, wherein:

a total opening area of the plurality of through holes in the other-side disk is set to be larger than that of another plurality of the through holes which are in the one-side disk.

5. The damping valve for the shock absorber according to claim 1, further comprising:

a leaf valve arranged on the other-side disk with an inner peripheral side as a fixed end and configured to open and close the port.

6. The damping valve for the shock absorber according to claim 5, wherein:

the leaf valve includes a plurality of leaf valves; and
the damping valve further comprises a ring mounted on any one of the plurality of leaf valves.

7. The damping valve for the shock absorber according to claim 1, wherein:

the port is a one-side port for permitting the passage of working fluid from the one chamber to the other chamber and has a through hole of the through holes which is in the one-side disk and formed in an inner peripheral side of the one-side disk; and the damping valve further comprises an other-side port for permitting the passage of the working fluid from the other chamber to the one chamber, and is formed in an outer peripheral side of the one-side disk.

8. A damping valve for a shock absorber, comprising:

a valve disk including a one-side disk and an other-side disk to be placed on the one-side disk, the valve disk partitioning one chamber and another chamber, the one-side disk having a mating surface mating with a mating surface of the other-side disk, each of the one-side disk and the other-side disk having an annular inner peripheral seat surface, and an annular outer peripheral seat surface, at an outer side of the inner peripheral seat surface, formed at corresponding positions of the respective mating surface;

a port including through holes formed in the one-side and other-side disks and allowing communication between the one and the other chambers, the through holes each being open between each of the inner peripheral seat surfaces and each of the outer peripheral seat surfaces, a plurality of the through holes, which are in the other-side disk, extending from the inner peripheral seat surface of the other-side disk to the outer peripheral seat surface of the other-side disk;

a shaft member penetrating through the valve disk; and a nut for fixing the valve disk to the shaft member by being threadably mounted on a tip of the shaft member, the nut being movable between first and second positions, wherein the other-side disk includes elastic deforming portions formed between the plurality of through holes of the other-side disk, wherein with the nut in the first position, the outer peripheral seat surface of the one-side disk and the outer peripheral seat surface of the other-side disk are in direct contact, while a clearance is formed between the inner peripheral seat surface of the one-side disk and the inner peripheral seat surface of the other-side disk, and wherein with the nut in the second position, the clearance is eliminated so that the inner peripheral seat surface of the one-side disk directly contacts the inner peripheral seat surface of the other-side disk.

9. The damping valve for the shock absorber according to claim 8, wherein with the nut in the first position, the inner peripheral seat surface of the one-side disk and the inner peripheral seat surface of the other-side disk are free of direct contact.

10. A method for forming a damping valve for a shock absorber, comprising:

providing a valve disk including a one-side disk and an other-side disk provided to be placed on the one-side disk, the one-side disk having a mating surface for mating with a mating surface of the other-side disk, each of the one-side disk and the other-side disk having an annular inner peripheral seat surface and an annular outer peripheral seat surface, which is at an outer side of the inner peripheral seat surface, formed at corresponding positions of the respective mating surface, a port including through holes formed in the one-side and other-side disks, a plurality of the through holes, which are in the other-side disk, extending from the inner peripheral seat surface of the other-side disk to the outer peripheral seat surface of the other-side disk, a shaft member penetrating through the valve disk, and a nut for fixing the valve disk to the shaft member, wherein the other-side disk includes elastic deforming portions formed between the plurality of through holes of the other-side disk;

threadably mounting the nut on a tip of the shaft member;

after the threadably mounting, tightening the nut to a first position, so that the outer peripheral seat surface of the one-side disk and the outer peripheral seat surface of the other-side disk are in direct contact, while a clearance is formed between the inner peripheral seat surface of the one-side disk and the inner peripheral seat surface of the other-side disk; and after the tightening, further tightening the nut to a second position so that the clearance is eliminated such that the inner peripheral seat surface of the one-side disk directly contacts the inner peripheral seat surface of the other-side disk, wherein the valve disk partitions one chamber and another chamber, the port allows for communication between the one and the other chambers, and each of the through holes of the port are open between each of the inner peripheral seat surfaces and each of the outer peripheral seat surfaces.

11. The method of claim 10, wherein with the nut in the first position, the inner peripheral seat surface of the one-side disk and the inner peripheral seat surface of the other-side disk are free of direct contact.

* * * * *